(12) United States Patent
Villé et al.

(10) Patent No.: US 7,177,478 B2
(45) Date of Patent: Feb. 13, 2007

(54) IMAGE DATA COMPRESSION

(75) Inventors: Johan Villé, Boechout (BE); Koen Van Hulle, Rumst (BE)

(73) Assignee: Xeikon International N.V., Lier (BE)

( * ) Notice: Subject to any disclaimer, the term of this patent is extended or adjusted under 35 U.S.C. 154(b) by 707 days.

(21) Appl. No.: 09/792,228

(22) Filed: Feb. 23, 2001

(65) Prior Publication Data

US 2001/0024293 A1    Sep. 27, 2001

(30) Foreign Application Priority Data

Feb. 24, 2000   (GB) ................................ 0004427.1

(51) Int. Cl.
*G06K 9/36*     (2006.01)
*G06K 9/46*     (2006.01)
*H04N 1/413*    (2006.01)

(52) U.S. Cl. .................. 382/245; 382/232; 358/426.13

(58) Field of Classification Search ........... 358/426.13; 382/232, 245, 249
See application file for complete search history.

(56) References Cited

U.S. PATENT DOCUMENTS

| | | | |
|---|---|---|---|
| 4,268,870 A | * | 5/1981 | Kitamura et al. ........... 358/296 |
| 4,956,638 A | * | 9/1990 | Larky et al. ............... 358/3.13 |
| 5,204,756 A | * | 4/1993 | Chevion et al. ............. 382/239 |
| 5,644,366 A | * | 7/1997 | Ushida et al. ............... 358/534 |
| 6,137,589 A | * | 10/2000 | Obrador et al. ............ 358/1.16 |
| 6,356,660 B1 | * | 3/2002 | Shannon ..................... 382/232 |

FOREIGN PATENT DOCUMENTS

GB    2 251 528 A    7/1992

OTHER PUBLICATIONS

Bentley et al. "A Locally Adaptive Data Compression Scheme". Communications of the ACM. vol. 29, No. 4. Apr. 1986 pp. 320-330.*
Thomborson et al., Systolic Implementations of a Move-to-Front Text Compressor, (1989) Proc. of Symposium on Parallel Algorithms, pp. 283-290. considered Jul. 15, 2004.

* cited by examiner

*Primary Examiner*—Vikkram Bali
*Assistant Examiner*—Colin LaRose
(74) *Attorney, Agent, or Firm*—Knobbe Martens Olson & Bear, LLP

(57) ABSTRACT

Two-dimensional blocks of line-work image data are subjected to: fractal reordering; run length encoding of the pixel values of the fractal re-ordered data, index encoding of the run length encoded pixel values; and entropy encoding of the index encoded pixel values and run lengths. This lossless, but in case of applying a quantisation step, lossy image data compression and decompression method is particularly suitable for handling image data in a printer environment, and more particularly for handling image data comprising line work data or both raster images and line work data.

14 Claims, 7 Drawing Sheets

| 169 | 169 | 255 | 255 | 255 | 255 | 255 | 255 | 255 | 255 | 255 | 255 | 255 | 255 | 255 | 255 |
|-----|-----|-----|-----|-----|-----|-----|-----|-----|-----|-----|-----|-----|-----|-----|-----|
| 169 | 169 | 255 | 255 | 255 | 255 | 255 | 255 | 255 | 255 | 255 | 255 | 255 | 255 | 255 | 255 |
| 169 | 169 | 66  | 00  | 00  | 00  | 00  | 00  | 00  | 00  | 00  | 00  | 00  | 00  | 00  | 00  |
| 169 | 169 | 66  | 66  | 00  | 00  | 00  | 00  | 00  | 00  | 00  | 00  | 00  | 00  | 00  | 00  |
| 169 | 169 | 66  | 66  | 00  | 00  | 00  | 00  | 00  | 00  | 00  | 00  | 00  | 00  | 00  | 00  |
| 169 | 169 | 66  | 66  | 66  | 00  | 00  | 00  | 00  | 00  | 00  | 00  | 00  | 00  | 00  | 00  |
| 169 | 169 | 66  | 66  | 66  | 00  | 00  | 00  | 00  | 00  | 00  | 00  | 00  | 00  | 00  | 00  |
| 169 | 169 | 66  | 66  | 66  | 66  | 00  | 00  | 00  | 00  | 00  | 00  | 00  | 00  | 00  | 00  |
| 169 | 169 | 66  | 66  | 66  | 66  | 00  | 00  | 00  | 00  | 00  | 00  | 00  | 00  | 00  | 00  |
| 169 | 169 | 66  | 66  | 66  | 66  | 66  | 00  | 00  | 00  | 00  | 00  | 00  | 00  | 00  | 00  |
| 169 | 169 | 66  | 66  | 66  | 66  | 66  | 00  | 00  | 00  | 00  | 00  | 00  | 00  | 00  | 00  |
| 169 | 169 | 33  | 66  | 66  | 66  | 66  | 66  | 00  | 00  | 00  | 00  | 00  | 00  | 00  | 00  |
| 169 | 169 | 33  | 66  | 66  | 66  | 66  | 66  | 00  | 00  | 00  | 00  | 00  | 00  | 00  | 00  |
| 169 | 169 | 33  | 33  | 66  | 66  | 66  | 66  | 66  | 00  | 00  | 00  | 00  | 00  | 00  | 00  |
| 169 | 169 | 33  | 33  | 66  | 66  | 66  | 66  | 66  | 00  | 00  | 00  | 00  | 00  | 00  | 00  |
| 169 | 169 | 00  | 33  | 33  | 66  | 66  | 66  | 66  | 66  | 00  | 00  | 00  | 00  | 00  | 00  |

*Fig.2*

| 169 | 169 | 255 | 255 | 255 | 255 | 255 | 255 | 255 | 255 | 255 | 255 | 255 | 255 | 255 | 255 |
|---|---|---|---|---|---|---|---|---|---|---|---|---|---|---|---|
| 169 | 169 | 255 | 255 | 255 | 255 | 255 | 255 | 255 | 255 | 255 | 255 | 255 | 255 | 255 | 255 |
| 169 | 169 | 66 | 00 | 00 | 00 | 00 | 00 | 00 | 00 | 00 | 00 | 00 | 00 | 00 | 00 |
| 169 | 169 | 66 | 66 | 00 | 00 | 00 | 00 | 00 | 00 | 00 | 00 | 00 | 00 | 00 | 00 |
| 169 | 169 | 66 | 66 | 00 | 00 | 00 | 00 | 00 | 00 | 00 | 00 | 00 | 00 | 00 | 00 |
| 169 | 169 | 66 | 66 | 66 | 00 | 00 | 00 | 00 | 00 | 00 | 00 | 00 | 00 | 00 | 00 |
| 169 | 169 | 66 | 66 | 66 | 00 | 00 | 00 | 00 | 00 | 00 | 00 | 00 | 00 | 00 | 00 |
| 169 | 169 | 66 | 66 | 66 | 66 | 00 | 00 | 00 | 00 | 00 | 00 | 00 | 00 | 00 | 00 |
| 169 | 169 | 66 | 66 | 66 | 66 | 00 | 00 | 00 | 00 | 00 | 00 | 00 | 00 | 00 | 00 |
| 169 | 169 | 66 | 66 | 66 | 66 | 66 | 00 | 00 | 00 | 00 | 00 | 00 | 00 | 00 | 00 |
| 169 | 169 | 66 | 66 | 66 | 66 | 66 | 00 | 00 | 00 | 00 | 00 | 00 | 00 | 00 | 00 |
| 169 | 169 | 33 | 66 | 66 | 66 | 66 | 00 | 00 | 00 | 00 | 00 | 00 | 00 | 00 | 00 |
| 169 | 169 | 33 | 66 | 66 | 66 | 66 | 00 | 00 | 00 | 00 | 00 | 00 | 00 | 00 | 00 |
| 169 | 169 | 33 | 33 | 66 | 66 | 66 | 66 | 66 | 00 | 00 | 00 | 00 | 00 | 00 | 00 |
| 169 | 169 | 33 | 33 | 66 | 66 | 66 | 66 | 66 | 00 | 00 | 00 | 00 | 00 | 00 | 00 |
| 169 | 169 | 00 | 33 | 33 | 66 | 66 | 66 | 66 | 66 | 00 | 00 | 00 | 00 | 00 | 00 |

*Fig.3*

FRACTAL RE-ORDERING

START, 169, 169, 169, 169, 169, 169, 169, 169, 66, 66, 66, 0, 255, 255, 255, 255, 255, 255, 255, 255, 255, 255, 255, 255, 0, 0, 0, 0, 0, 0, 0, 0, 0, 66, 0, 0, 0, 0, 0, 0, 0, 0, 0, 66, 0, 66, 66, 66, 66, 66, 66, 66, 66, 66, 66, 169, 169, 169, 169, 169, 169, 169, 169, 169, 169, 169, 169, 66, 66, 66, 66, 66, 66, 66, 33, 169, 169, 169, 169, 169, 169, 169, 169, 169, 169, 169, 169, 33, 0, 33, 33, 33, 33, 33, 66, 66, 66, 66, 66, 66, 33, 66, 66, 66, 66, 66, 66, 66, 66, 66, 66, 66, 0, 66, 66, 66, 66, 66, 66, 66, 66, 66, 66, 0, 66, 0, 0, 0, 0, 0, 0, 0, 0, 0, 0, 0, 0, 0, 0, 0, 0, 0, 0, 0, 66, 66, 66, 66, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 255, 255, 255, 255, 255, 255, 255, 255, 255, 255, 255, 255, 0, 0, 0, 0, 0, 0, 0, 0, 255, 255, 255, 255, END

Fig.4

RUN-LENGTH ENCODING

START, 8 × 169, 3 × 66, 1 × 0, 12 × 255, 9 × 0, 1 × 66, 10 × 0, 1 × 66, 1 × 0, 10 × 66, 12 × 169, 7 × 66, 1 × 33, 12 × 169, 1 × 33, 1 × 0, 5 × 33, 6 × 66, 1 × 33, 11 × 66, 1 × 0, 10 × 66, 1 × 0, 1 × 66, 21 × 0, 4 × 66, 81 × 0, 12 × 255, 8 × 0, 4 × 255, END

Fig.5

INDEX ENCODING

| SEQUENCE | RUN LENGTH | INDEX ENCODING |
|---|---|---|
| 1 | 8 × 169 | 8 × NEW + 169 |
| 2 | 3 × 66 | 3 × NEW + 66 |
| 3 | 1 × 0 | 1 × 3 |
| 4 | 12 × 255 | 12 × 3 |
| 5 | 9 × 0 | 9 × 1 |
| 6 | 1 × 66 | 1 × 2 |
| 7 | 10 × 0 | 10 × 1 |
| 8 | 1 × 66 | 1 × 1 |
| 9 | 1 × 0 | 1 × 1 |
| 10 | 10 × 66 | 10 × 1 |
| 11 | 12 × 169 | 12 × 3 |
| 12 | 7 × 66 | 7 × 1 |
| 13 | 1 × 33 | 1 × NEW + 33 |
| 14 | 12 × 169 | 12 × 2 |
| 15 | 1 × 33 | 1 × 1 |
| 16 | 1 × 0 | 1 × 3 |
| 17 | 5 × 33 | 5 × 1 |
| 18 | 6 × 66 | 6 × 3 |
| 19 | 1 × 33 | 1 × 1 |
| 20 | 11 × 66 | 11 × 1 |
| 21 | 1 × 0 | 1 × 2 |
| 22 | 10 × 66 | 10 × 1 |
| 23 | 1 × 0 | 1 × 1 |
| 24 | 1 × 66 | 1 × 1 |
| 25 | 21 × 0 | 21 × 1 |
| 26 | 4 × 66 | 4 × 1 |
| 27 | 81 × 0 | 81 × 1 |
| 28 | 12 × 255 | 12 × 4 |
| 29 | 8 × 0 | 8 × 1 |
| 30 | 4 × 255 | 4 × 1 |

Fig.6

HUFFMAN CONVERSION TABLE

| INDEX ENCODED | | HUFFMAN BINARY CODE |
|---|---|---|
| RUN LENGTH | INDEX | |
| 1 | 1 | 00 |
| 2 | 2 | 01 |
| 3 | 3 | 100 |
| 4 | 4 | 101 |
| 5 | 5 | 110000 |
| 6 | 6 | 110001 |
| 7 | 7 | 110010 |
| 8 | 8 | 110011 |
| 9 | 9 | 1101000 |
| 10 | 10 | 1101001 |
| 11 | 11 | 1101010 |
| 12 | 12 | 1101011 |
| 13 | 13 | 1101100 |
| 14 | 14 | 1101101 |
| 15 | 15 | 1101110 |
| 16 | 0 | 1101000 |
| N | NEW N | 111xxxxxxx* |

*xxxxxxx = N in the case of encoding the index
= M-1 in the case of encoding the run length

Fig.7

HUFFMAN ENCODING

| SEQ. | INDEX ENCODING | HUFFMAN CODE | BITS |
|---|---|---|---|
| 1 | 8 × NEW + 169 | 110011 111 10101001 | 17 |
| 2 | 3 × NEW + 66 | 100 111 01000010 | 14 |
| 3 | 1 × 3 | 00 100 | 5 |
| 4 | 12 × 3 | 1101011 100 | 10 |
| 5 | 9 × 1 | 1101000 00 | 9 |
| 6 | 1 × 2 | 00 01 | 4 |
| 7 | 10 × 1 | 1101001 00 | 9 |
| 8 | 1 × 1 | 00 00 | 4 |
| 9 | 1 × 1 | 00 00 | 4 |
| 10 | 10 × 1 | 1101001 00 | 9 |
| 11 | 12 × 3 | 1101011 100 | 10 |
| 12 | 7 × 1 | 110010 00 | 8 |
| 13 | 1 × NEW + 33 | 00 111 00100001 | 13 |
| 14 | 12 × 2 | 1101011 01 | 9 |
| 15 | 1 × 1 | 00 00 | 4 |
| 16 | 1 × 3 | 00 100 | 5 |
| 17 | 5 × 1 | 110000 00 | 8 |
| 18 | 6 × 3 | 110001 100 | 9 |
| 19 | 1 × 1 | 00 00 | 4 |
| 20 | 11 × 1 | 1101010 00 | 9 |
| 21 | 1 × 2 | 00 01 | 4 |
| 22 | 10 × 1 | 1101001 00 | 9 |
| 23 | 1 × 1 | 00 00 | 4 |
| 24 | 1 × 1 | 00 00 | 4 |
| 25 | 21 × 1 | 111 00010100 00 | 13 |
| 26 | 4 × 1 | 101 00 | 5 |
| 27 | 81 × 1 | 111 01010000 00 | 13 |
| 28 | 12 × 4 | 1101011 101 | 10 |
| 29 | 8 × 1 | 110011 00 | 8 |
| 30 | 4 × 1 | 101 00 | 5 |
| | TOTAL | | 239 |

Fig.8

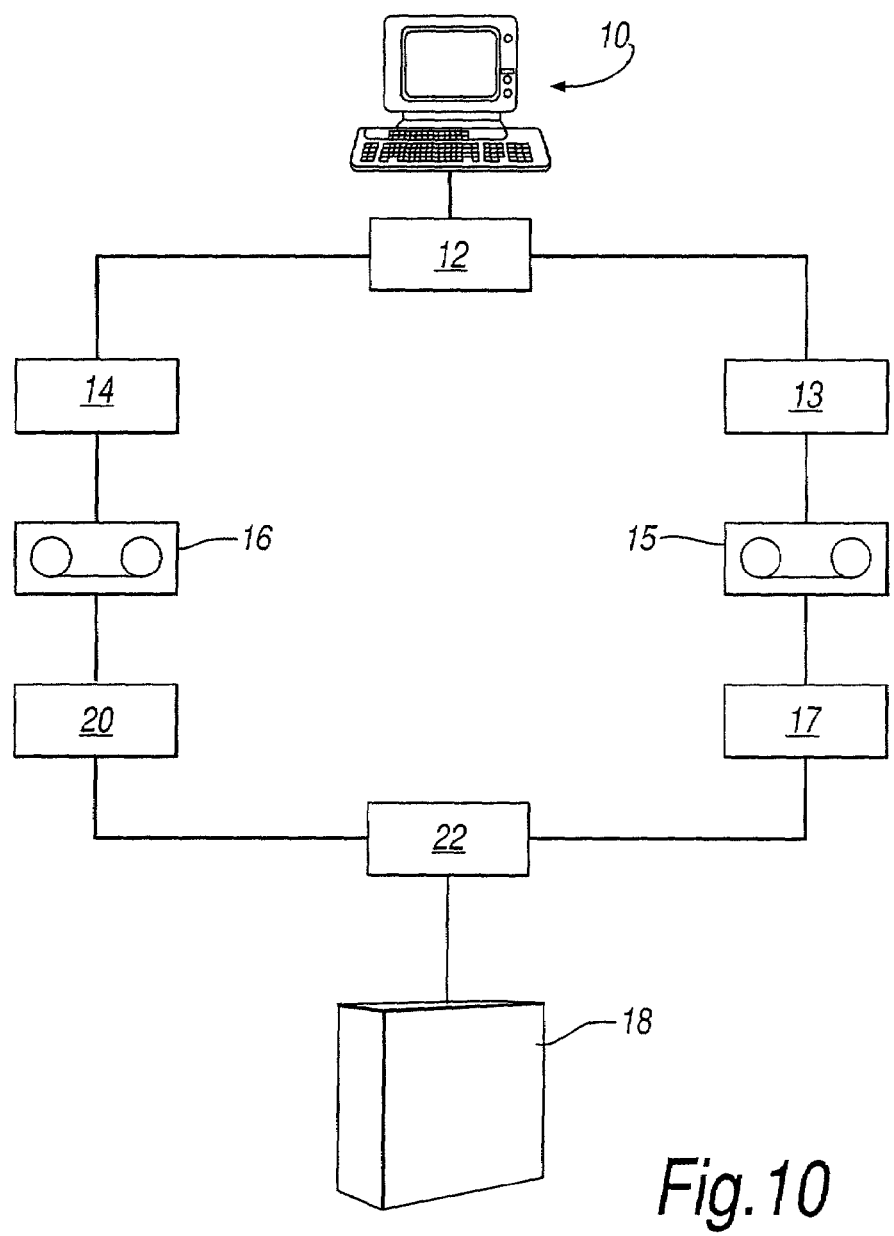

IMAGE DATA COMPRESSION

FIELD OF THE INVENTION

The present invention relates to an image data compression and decompression method, and particularly to compression and decompression of line work data, and to a method of operating a printer or copier using such a method.

BACKGROUND OF THE INVENTION

In electronic printing, image data is fed to the printer, for example from a scanner which scans an original of the image to be printed, or from a suitable image creation and/or image processing computer program. As used herein, the term "printer" includes not only devices for printing artificially created images, but also devices for printing copies of an original, otherwise known as copiers.

Most electronic printers are designed to print image data pixel-by-pixel and line-by-line at a more or less constant speed, irrespective of the nature of the image. Therefore, the printing station of the printer must receive image data at said more or less constant speed, as defined in terms of pixels per second. However, said image data can contain elements of various different types, for example artificially created text and graphics, hereinafter named line work data as well as halftone presentations of continuous tone images, hereinafter named raster images. Consequently, the amount of data required for printing each line of the final image will vary depending upon the nature of the image. Usually a block of data, representing for example a whole page of printed images, is received and stored in an intermediate buffer before printing begins, so that the data may be released from the buffer at the speed required by the printing station.

In order to store as much data as possible, and in order to keep the bandwidth and capacity requirements of the image data storage and processing equipment to a minimum, it is known to compress the data while or after it is being generated. Various compression regimes have been described in the art and some are widely used. Many of such general purpose compression methods, such as LZW or arithmetic encoding, are known to losslessly compress arbitrary data in a very efficient way, i.e. achieving very high compression ratios, but are in general complex and thus expensive to implement. Also, such general-purpose compression techniques work on one-dimensional data streams and do not take advantage of certain correlations that typically exist between pixels in two-dimensional images. Other well-known compression methods, such as JPEG, are specifically targeted to efficiently compress image data but said compression methods typically are lossy, i.e. certain information is lost during the compression stage.

Lossy compression is, to a certain extent, acceptable when being applied to image data in electronic printing. This is especially true for raster images because the information that is lost may have been difficult to be seen by the human eye anyway, for example because it was of a too high spatial frequency. Lossy compression, e.g. as implemented by the JPEG method, is however often unacceptable when being applied to line work elements in electronic printing.

A known method to overcome the above dilemma consists of separating the line work elements of the image data from the raster images, and compressing each of said elements using a different method, e.g. lossless LZW for line work elements and lossy JPEG for raster images.

It is well known that state-of-the-art lossless compression methods result in compression ratios that are dependent on the actual data on which they are applied. Thus, while such methods may on average result in high compression ratios, the worst case compression efficiency may be very low. With worst case compression is meant: the compression factor of the band that compresses worst, where a band is a set of N lines out of the image, N being the block's dimension. As a matter of fact, the worst case compression factor may even be smaller than 1:1, meaning that the compressed information is less compact than the respective uncompressed information. Storing, handling and decompressing such image data at constant speeds, as is required in electronic printing, thus requires over-dimensioned controllers.

In a sheet fed printer, sometimes the use of such over-dimensioned controllers can be avoided by delaying the feeding of each sheet of receiving material through the printing station until all necessary image processing steps are completed. Particularly, in the event that an image of unusual content, which requires additional processing time, is offered to the printer, the printer control system is able to delay the sheet feed mechanism for the required period. Because of the known maximum size of the sheets in a sheet fed printer, a intermediate buffer can be provided to temporarily store a full sheet's image data until all of it is has been pre-processed. This is however an inefficient way of solving the problem which reduces the overall speed of the printer. However, when the page's image data is not fully buffered, or when there is a desire to reduce the time and thus the spaces between consecutively printed pages, in other words print in a more efficient way, over-dimensioned controllers are a prerequisite to be able to use state-of-the-art compression methods.

In a web fed printer, delaying the feeding of sheets is not possible. In such a printer, the web of receiving material is usually fed through the printing station continuously at a substantially constant speed. The image data, no matter how complex its content, thus needs to be supplied to the printer also continuously, i.e. page after page, and at a substantially constant speed. Also, web fed printers may have the capability to print pages of almost unlimited length so that one can hardly dimension a buffer to temporarily buffer a page's image data while it is being processed. Thus, while some state-of-the-art compression regimes are able to produce significant compression ratios on average, their worst case performance can be so poor that there is insufficient time to process the image before it is required by the printing station. As a result, web-fed printers have to be provided with expensive over-dimensioned controllers.

We are aware that data compression is used in television systems, such as is described in British patent application GB 2251528A (British Broadcasting Corporation) which describes a digitally assisted HD-MAC system in which blocks of pixels are encoded by methods such as a Peano scan with run-length encoding or using a Huffman code.

OBJECTS OF THE INVENTION

It is an object of the present invention to provide an image data compression method which is suitable for compressing image data, particularly image data which is composed of line work data or both raster images and line work data, to be printed using an electronic printer.

It is a further object of the present invention to provide an image data compression method which is suitable for compressing image data to be printed using an electronic web-fed printer.

SUMMARY OF THE INVENTION

We have discovered that this objective can be achieved, and other useful benefits obtained, by a method embodying a combination of specific data processing techniques.

Thus, according to the invention there is provided an image data compression method for use in a printer environment in which two-dimensional blocks of line-work image data are subjected to the following lossless steps:
(i) fractal reordering of said two-dimensional blocks of line-work image data;
(ii) run length encoding of the fractal re-ordered data;
(iii) index encoding of the pixel value of the run length encoded data; and
(iv) entropy encoding of the index encoded pixel value.

As used herein, the term "for use in a printer environment" is intended to mean that the method is part of a printing or copying process, irrespective of whether or not the processed image data is subsequently printed.

In an embodiment of the invention, the line-work image data compression method may be such that the entropy encoding step (step (iv)) may be preceded by the step of index encoding of the run length of the run length encoded data.

In an embodiment of the invention, the line-work image data compression method may be such that the entropy encoding step (step (iv)) includes entropy encoding of the run length values.

The block of line-work image data which is treated can be of any size. Higher compression ratios can be obtained with larger blocks of data, but require greater computing capacity, and the beneficial effects plateau off with increasing block size. The block of image data preferably represents an N pixel×N' pixel image block, wherein N and N' are independent numbers ranging from 4 to 64, such as a 16×16 pixel block. The optimum block size depends upon the output resolution and the available memory and may depend upon the nature of the image. If this image data also includes raster images and if this data is compressed using block-oriented techniques such as JPEG, then it is convenient that the ratio, or the inverted ratio, between the block height and width, used for compressing the line work data according to the present invention, and the block height and width, used for compressing the raster images, is a positive whole number.

The line-work image data comprises a sequence of values, each of which indicates the pixel value at a particular location in the image which is to be printed. This data would normally be generated either by scanning an original of the image to be printed, or artificially, for example by use of a suitable image creation or processing computer program. The image will include line work data, but may represent a combination of both line work and raster images. The present invention is however particularly suited to the compression of purely line work images.

The data is first subjected to fractal re-ordering. This process attempts to group neighboring pixels which tend to have the same or very similar pixel value together. A number of fractal re-ordering regimes are known. The data is ordered along a path defined by the regime leading to a revised sequence of pixels. At this stage no compression has taken place; the data has simply been rearranged. Because of the fact that neighboring pixel values in a two-dimensional image typically show a high degree of correlation, fractal reordering generally results in the same pixel value occurring many times in a sequence or run. This enables the next step, which is run-length encoding, to take place in a more efficient manner.

In run length encoding, a sequence of identical pixel values is replaced with data indicating this value and the number of times it occurs in the sequence. By the previous use of fractal re-ordering, most images will be such that run-length encoding will produce a significant reduction in the total amount of data, i.e. a significant compression.

The data is now ready for the process of index encoding. In this process, the pixel values are now replaced by indexes in a table of pixel values. By properly constructing and maintaining the table of pixel values, the indexes will typically be of a smaller value than the actual pixel value.

In a preferred embodiment of the invention, the table is constructed such that pixel values are arranged according to the position in which they occurred in the run-length encoded line-work image data sequence. The index value actually indicates where in the sequence a particular value last occurred.

This index encoding method preferably involves what is known as "move to front". Before starting to compress each image, the control device is programmed with a predefined table of all possible pixel values. For each item of data generated by the run-length encoding, the pixel value is replaced by a number indicating the position of that pixel value in the indexing table. The pixel value is then moved to the zero or top position of the table and the values that were positioned above the moved pixel value are moved one position down the table, thereby generating a revised indexing table. The revised indexing table is used for the next item of run-length encoded data, and so on. In this way all the run-encoded pixel values are subject to index encoding.

We are aware that a high-speed text-compression system is described in "Systolic Implementations of a Move-to-Front Text Compressor" by Thomborson and Wei, Proc of 1989 Symp on Parallel Algorithms, New York, 19–21 Jun. 1989, pp 283–290.

In a modified regime, referred to as a "move to front using a partial table", the indexing table is smaller than would be necessary to include all possible pixel values. The indexing table initially contains only a selected number of pixel values. When an item of run-length encoded data includes a pixel value which is not found in the indexing table, then that item's pixel value is replaced by a term such as "NEW+[pixel value]", and the new pixel value is added to the front of the indexing table for later use, moving all other pixel values one position down in the table.

The indexing table may be empty at the beginning of an image, or may contain pre-set values. At the beginning of each block of data the indexing table however corresponds to that resulting from the index encoding of the preceding block of data.

Index encoding thus replaces pixel values with more frequently occurring index values. Such index encoding therefore adds to the degree of compression which can be obtained in the next step.

Entropy encoding of the indexed values and optionally of the run length values then follows. A number of entropy encoding methods are known based upon the frequency with which values occur, including Huffman encoding, wavelet transformation and arithmetical encoding. In Huffman encoding, the most commonly used index values and run length values are replaced, where possible, by smaller representations (codes), according to a pre-set regime, based upon experience of the type of image being processed. A fixed code table may be used, or a code table may be selected from a range of available such tables. In addition to this, the code table may be constructed adaptively, i.e. while encoding line-work image data, the table is continuously being adjusted according to the frequency of the pixel values and run lengths found in the most recently encoded parts of the image.

After compression, the data is preferably passed to a data buffer where it is stored until demanded by the printer. Alternatively, the compressed data can be archived, distributed and or previewed and/or archived in a so-called printer environment where it is convenient to handle compressed information. Examples of a printer environment are graphic tools such as a printer or a copier or an image processing unit. Upon demand, the data is fed to a line-work decompressing processing unit, which reverses all of the re-ordering and compression steps referred to above. In order to achieve this, the line-work decompressing processing unit is programmed with details of the fractal reordering and entropy encoding regimes which have been used in compressing the data.

The fractal reordering step may be followed or preceded by a lossy quantisation compression step. Quantisation is particularly valuable where an image includes portions where the pixel values change gradually. In quantisation, which is a lossy technique, a small one- or two-dimensional portion of data, is processed as follows. If the pixel values within that portion are close to each other, i.e. the variation is below a predetermined threshold, then those values are replaced by a single value close to the average density of that portion. The size of the portion treated by this technique is not necessarily the same as, and will generally be smaller than, the size of the block to which the process of the invention is applied. Certain pixel values in the treated portion, such as the minimum and the maximum pixel value, may be "locked" so as to prevent them being altered by this process. While this technique does not by itself lead to compression, the increased recurrence of the same pixel value enables a greater degree of compression to be achieved by the run-length encoding technique described above.

In a preferred embodiment of the invention, the lossy quantisation step is only applied when the compression factor resulting from the compression without quantisation is below a predetermined threshold. Determining if this condition is or will be met can be done on the complete image or on parts of the image in various ways. This determination can be executed in advance of the compression, based upon information about the nature of the image supplied by its creator. Alternatively, this determination can be executed after compression without quantisation of the complete image, or after each part of the image. If so, the image or part of the image is compressed anew, this time while applying the quantisation step. Again alternatively, this determination can be executed during the compression of the complete image, or each part of the image. In the latter case, when a predetermined minimum compression factor is not going to be reached, quantisation can be enabled or disabled or the degree of quantisation can be adjusted.

The method is particularly useful for operating a printer, in which receiving material, in web or sheet form, is continuously fed at a constant speed through a printing station, data representing line work images to be printed is received, the data is compressed by the method described above, the compressed data is stored in a data store, data from the data store is continuously decompressed, and the decompressed data is continuously fed to the printing station to print the images on the receiving material. The invention is particularly applicable when the receiving material is continuously fed at a constant speed through the printing station, although the receiving material may be fed at the same or at different speeds through other stations of the printer, such as a fixing station.

BRIEF DESCRIPTION OF THE DRAWINGS

FIG. 1 shows a block of a sequence of data as may be received by the control device of a web-fed electrostatic printer;

FIG. 2 shows the same data as displayed in a two-dimensional form;

FIG. 3 shows a suitable path for fractal re-ordering of the data;

FIG. 4 shows the sequence of data after reordering;

FIG. 5 shows the data after run-length encoding;

FIG. 6 shows the process of index encoding the data;

FIG. 7 shows a Huffman encoding table;

FIG. 8 shows the process of Huffman encoding the data;

FIGS. 9A and 9B show a block of line-work image data subjected to quantisation and FIG. 10 is a diagrammatic representation of a possible hardware arrangement for carrying out a method according to the invention.

DETAILED DESCRIPTION OF THE INVENTION

The invention will now be further described, purely by way of example, with reference to the accompanying drawings.

FIG. 1 shows a block of a sequence of 256 data values of a line work image, as may be received by the control device of a web-fed electrostatic printer after separation from any raster image.

The data comprises a sequence of values, each of which indicates the pixel value at a particular location in the image which is to be printed. In the presently described example, up to 256 pixel values (i.e. 0 to 255) are possible at each pixel.

FIG. 2 shows the same data as displayed in a two-dimensional form. Each rectangle in this drawing represents one pixel of the image to be printed. In this case, the block of data to be processed represents a 16×16 block of pixels. The numbers found in the rectangles indicate the pixel value of the image at that pixel.

The data is now subjected to fractal re-ordering. A suitable fractal re-ordering regime is shown in FIG. 3. The data is ordered along the indicated path leading to the sequence of data shown in FIG. 4. It will be apparent from FIG. 4 that the same pixel value occurs many times in a sequence or run. In the example given, the pixel value "0" occurs 81 times in a single run. This enables the next step, which is run-length encoding, to take place.

In run length encoding, a sequence of identical values is replaced with data indicating the value and the number of times it occurs in the sequence. Thus the first eight data items derived from the fractal re-ordering, i.e. the first eight occurrences of the value "169", are replaced by data representing "8×169". By the previous use of fractal re-ordering, most images will be such that run-length encoding will produce a significant reduction in the total amount of data, i.e. a significant compression, as shown in FIG. 5.

FIG. 6 is a table showing the run-length encoded data of FIG. 5 in column 2 (the rows of this table have been numbered in column 1 for ease of reference). The data is now ready for the process of index encoding.

In this process, the pixel values are now replaced by data values which will normally be of a smaller size. This is done by indicating where in the sequence a particular value last occurred.

The method involves what is known "move to front using a partial table". The control device is initialized with a table of common pixel values, which in the present example is:

| POSITION | DENSITY |
|---|---|
| 0 | 255 |
| 1 | 0 |
| 2 | 254 |
| 3 | 1 |
| 4 | 253 |
| 5 | 2 |
| 6 | 252 |
| 7 | 3 |
| 8 | 251 |
| 9 | 4 |
| 10 | 250 |
| 11 | 5 |
| 12 | 249 |
| 13 | 6 |
| 14 | 248 |
| 15 | 7 |

In line 1 of FIG. 6, the run-length encoding has generated the data "8×169". The pixel value "169" does not occur in the above indexing table and therefore represents a new value. The data "8×169" is replaced by "8×NEW+169", the value "169" is inserted into the indexing table at position 0, and all other values are moved down throwing out the last value, so that the indexing table now reads as follows:

| POSITION | DENSITY |
|---|---|
| 0 | 169 |
| 1 | 255 |
| 2 | 0 |
| 3 | 254 |
| 4 | 1 |
| 5 | 253 |
| 6 | 2 |
| 7 | 252 |
| 8 | 3 |
| 9 | 251 |
| 10 | 4 |
| 11 | 250 |
| 12 | 5 |
| 13 | 249 |
| 14 | 6 |
| 15 | 248 |

In line 2 of FIG. 6, the run-length encoding has generated the data "3×66". The pixel value "66" does not occur in the above indexing table and therefore represents a second new value. The data "3×66" is replaced by "3×NEW+66", the value "66" is inserted into the indexing table at position 0, and all other values are moved down throwing out the last value, so that the indexing table now reads as follows:

| POSITION | DENSITY |
|---|---|
| 0 | 66 |
| 1 | 169 |
| 2 | 255 |

-continued

| POSITION | DENSITY |
|---|---|
| 3 | 0 |
| 4 | 254 |
| 5 | 1 |
| 6 | 253 |
| 7 | 2 |
| 8 | 252 |
| 9 | 3 |
| 10 | 251 |
| 11 | 4 |
| 12 | 250 |
| 13 | 5 |
| 14 | 249 |
| 15 | 6 |

In line 3 of FIG. 6 the run-length encoding has generated the data "1×0". The pixel value "0" does occur in the above indexing table at position 3. The data "1×0" is replaced by "1×3", the value "0" is inserted into the indexing table at position 0, and the values at positions 0 to 2 are moved down, so that the indexing table now reads as follows:

| POSITION | DENSITY |
|---|---|
| 0 | 0 |
| 1 | 66 |
| 2 | 169 |
| 3 | 255 |
| 4 | 254 |
| 5 | 1 |
| 6 | 253 |
| 7 | 2 |
| 8 | 252 |
| 9 | 3 |
| 10 | 251 |
| 11 | 4 |
| 12 | 250 |
| 13 | 5 |
| 14 | 249 |
| 15 | 6 |

In line 4 of FIG. 6, the run-length encoding has generated the data "12×255". The pixel value "255" does occur in the above indexing table at position 3. The data "12×255" is replaced by "12×3", the value "255" is inserted into the indexing table at position 0, and the values at positions 0 to 2 are moved down, so that the indexing table now reads as follows:

| POSITION | DENSITY |
|---|---|
| 0 | 255 |
| 1 | 0 |
| 2 | 66 |
| 3 | 169 |
| 4 | 254 |
| 5 | 1 |
| 6 | 253 |
| 7 | 2 |
| 8 | 252 |
| 9 | 3 |
| 10 | 251 |
| 11 | 4 |
| 12 | 250 |
| 13 | 5 |
| 14 | 249 |
| 15 | 6 |

In this way all the run-encoded values are subject to index encoding, generally replacing the pixel values with smaller numbers. Such index encoding therefore adds to the degree of compression already obtained by run-length encoding.

FIG. 8 shows the process of Huffman encoding the data. In this example, the values 0 to 16 are replaced as indicated in FIG. 7. Thus, for example, in line 8 of FIG. 6, the data "1×1" becomes "00 00", while in line 1 of FIG. 6, the data "8×NEW 169" becomes "11011 11 10101001". The Huffman encoded data is shown in FIG. 8, together with the number of bits required to express each line of data. In this example, the total number of bits required for the block of line-work image data being processed is 239, representing a compression ratio of 256×8÷239=8.57.

COMPARATIVE EXAMPLE

Taking three representative sets of images, varying in compressibility from simple over typical to complex, we have found that run length encoding alone can lead to an average compression factor of 23 for the set of simple images, 12.5 for the set of typical images, and 0.9 for the set of complex images. The prior art technique of LZW, using the same line-work image data, produces compression factors of respectively 93, 22 and 1.1. The compression method according to the present invention, even without the optional step of lossy quantisation, using the same line-work image data, produces compression factors of respectively 55, 39 and 3.5. Thus, while the compression method according to the invention may not be as effective as LZW on images that are easily compressible, it is almost twice as effective as LZW on typical images and even more than three times as effective on complex images. This significantly reduces the storage, buffering and bandwidth requirements of image processing controllers used in printers that require a more or less constant supply of (decompressed) line-work image data.

In quantisation, which is a lossy technique, but which may optionally precede the lossless compression techniques described above, a small two dimensional portion of data, such as a 2×2 pixel block, is processed as follows. If the pixel values within that block are close to each other, i.e. the variation is below a predetermined threshold, then those values are replaced by a single value representative of the average density of that block. Thus in FIG. 9A an example of a 2×2 pixel block of data as received is shown. Two pixels carry the pixel values "100", one carries the value "99" and one the value "101". These values are close to each other and can therefore all be replaced by an average value "100", so that this 2×2 pixel block is transformed as shown in FIG. 9B.

As shown in FIG. 10, an interactive user interface, such as a personal computer 10, is used to generate an image comprising line work and raster image elements. These items are derived from various sources in a known manner and combined according to the users preference in a desired sequence on the page or pages to be printed. The images are rastered, that is expressed in a pixel-by-pixel digital form, each item of data including information indicative of the pixel location and the density of the image to be printed. Where the image is a multi-color image, it is usual that three, or more usually four sets of such data are generated, one set for each color separation.

The image data is sent to a image splitter 12, which may be part of a raster image processor (RIP), or be controlled by a RIP, where, depending upon an assessment of the image by the RIP, line work data is separated from raster images. The line work data is passed to line work compression processor 14 where the compression according to the invention takes place. The compressed line work data generated in the processor 14 is now passed to a line work buffer 16, where it is stored until required. When the printer 18 is ready to print, compressed line work data is passed from the buffer 16 to a line work decompression processor 20 where it is decompressed.

The separated raster image data is passed to a raster image compression processor 13 where it is processed and compressed by means known per se, such as the commonly used JPEG compression scheme, stored in a raster image buffer 15 and subsequently decompressed in a raster image decompression processor 17.

Both sets of data are then fed to a processor 22 where they are combined before being forwarded to the printer 18 for immediate printing. The present invention is particularly useful in combination with the data merging procedures described in co-pending European patent application 99204592, filed Dec. 24, 1999 by Agfa-Gevaert N V, to which the reader's attention is hereby drawn.

Although FIG. 10 shows the line work buffer 16 and the raster image buffer 15 as separate units, it is also possible to use a single buffer for storing both forms of data, the stored compressed data being fed to either the line work decompression processor 20 or the raster image decompression processor 17, according to its nature.

What is claimed is:

1. An image data compression method for use in a printer environment, in which two-dimensional blocks of line-work data representing an original image and having at least three different pixel values are subjected to the following lossless acts:
   (i) fractal reordering of the original image data;
   (ii) run length encoding of the fractal re-ordered data;
   (iii) index encoding of the at least three different pixel values of the run length encoded data by use of a dynamic indexing table; and
   (iv) entropy encoding of the index encoded pixel values.

2. The method according to claim 1, wherein the acts are preceded by the separation of the line-work image data from raster image data.

3. The method according to claim 2, wherein the block of image data represents an N pixel×N' pixel image block, wherein N and N' are selected independently from the range of 4 to 64.

4. The method according to claim 2, wherein the entropy encoding comprises Huffman encoding.

5. The method according to claim 4, wherein the entropy encoding includes entropy encoding of the run length values.

6. The method according to claim 1, wherein the fractal reordering is preceded by a lossy quantization compression act.

7. The method according to claim 1, wherein the fractal reordering is followed by a lossy quantization compression act.

8. A method of operating a printer, comprising:
   continuously feeding receiving material through a printing station;
   receiving image data representing an original image to be printed, the original image data comprising line work data having at least three different pixel values;
   compressing the line-work data by subjecting two-dimensional blocks of line-work data to the lossless acts of:
   (i) fractal reordering of the original image data;
   (ii) run length encoding of the fractal re-ordered data;

(iii) index encoding of the at least three different pixel values of the run length encoded data by use of a dynamic indexing table; and (iv) entropy encoding of the index encoded pixel values storing the compressed data in a data store; continuously decompressing data from the data store; and feeding decompressed data continuously to the printing station to print the images on the receiving material.

9. The method according to claim 8, wherein the receiving material is continuously fed at a constant speed through the printing station.

10. An image processing device for use with a printer environment, comprising:

(a) a data compression device in which two-dimensional blocks of line-work image data representing an original image and having at least three different pixel values are subjected to the lossless acts of fractal reordering of the original image data, run length encoding of the fractal re-ordered data, index encoding of the at least three different pixel values of the run length encoded data by use of a dynamic indexing table, and entropy encoding of the index encoded pixel values;

(b) a buffer for storing compressed image data obtained from the data compression device; and (c) a line-work decompression processor for decompressing the compressed line-work image data in the buffer when the printer is ready to print.

11. The image processing device as in claim 10, further comprising:

an image splitter adapted to receive an image to be processed and to separate line work image data from raster image data; and a processor adapted to combine decompressed line work data with raster image data before being forwarded to the printer.

12. A printer comprising a feed device for feeding receiving material through a printing station, an image processing device, and a printing station to print processed images from the processing device onto the receiving material, wherein the processing device comprises:

(a) a line-work data compression device in which two-dimensional blocks of line-work image data representing an original image and having at least three different pixel values are subjected to the lossless acts of fractal reordering of the original image data, run length encoding of the fractal re-ordered data, index encoding of the at least three different pixel values of the run length encoded data by use of a dynamic indexing table, and entropy encoding of the index encoded pixel values;

(b) a buffer for storing compressed line-work image data from the data compression device; and (c) a line-work decompression processor for decompressing the compressed line-work image data in the line work buffer when the printing station is ready to print.

13. The printer according to claim 12, further comprising:

an image splitter for receiving an image to be processed and for separating linework image data from raster image data; and a processor for combining decompressed line work data with raster image data before being forwarded to the printer.

14. A computer-readable medium storing instructions that when executed by a computer perform an image data compression method for use in a printer environment, in which two-dimensional blocks of line-work data representing an original image and having at least three different pixel values are subjected to the following lossless acts:

(i) fractal reordering of the original image data;

(ii) run length encoding of the fractal re-ordered data;

(iii) index encoding of the at least three different pixel values of the run length encoded data by use of a dynamic indexing table; and (iv) entropy encoding of the index encoded pixel values.

\* \* \* \* \*